INVENTOR
AUGUST W. GUSTAFSON

BY

ATTORNEY

Jan. 17, 1961     A. W. GUSTAFSON     2,968,266
APPARATUS FOR TREATING SOIL DURING PLANTING
Filed Jan. 23, 1958     3 Sheets-Sheet 3
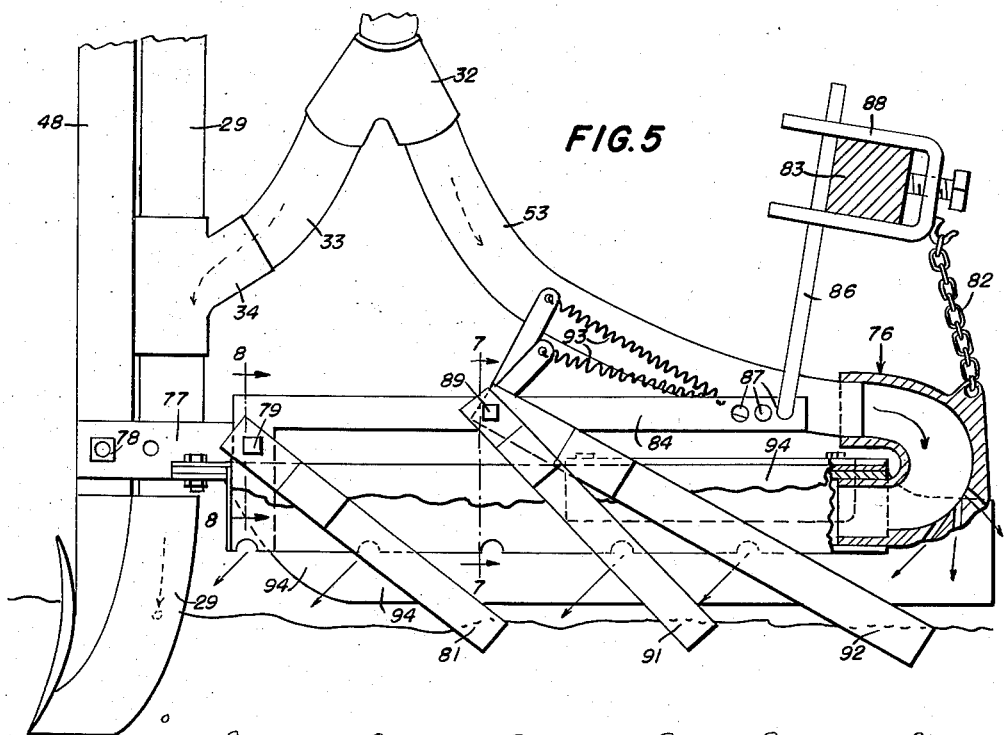
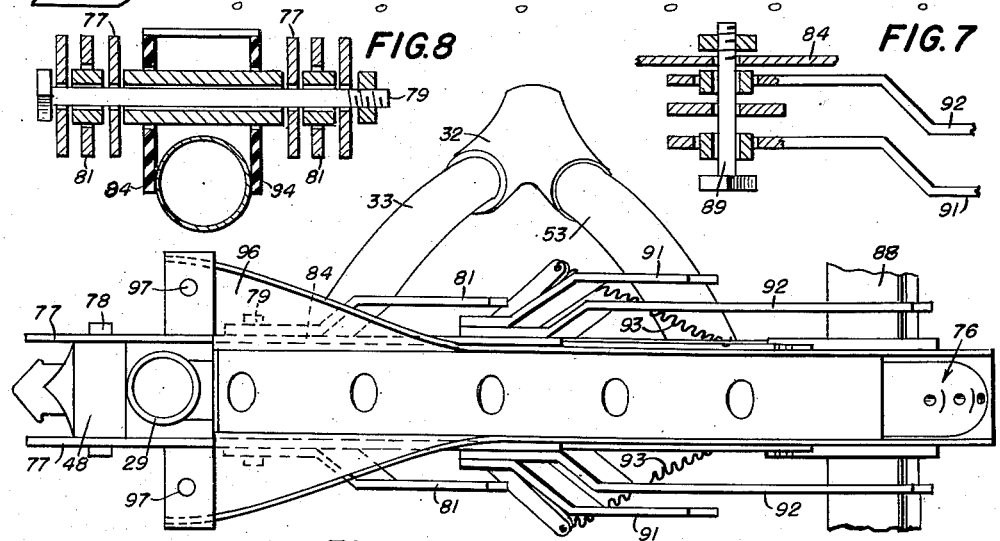
INVENTOR
AUGUST W. GUSTAFSON
BY
ATTORNEY

United States Patent Office 2,968,266
Patented Jan. 17, 1961

2,968,266

APPARATUS FOR TREATING SOIL DURING PLANTING

August W. Gustafson, Baldwin and Navigation Blvds., Corpus Christi, Tex.

Filed Jan. 23, 1958, Ser. No. 710,769

5 Claims. (Cl. 111—80)

The present invention relates to equipment adapted to be attached to conventional types of planting apparatus so that chemicals in pulverulent form may be added to and mixed with the soil as seed is planted therein and more particularly pertains to apparatus for treating the soil in the immediate vicinity of the planted seed so as to retard fungi or insects which attack the seed or part of the plant growth beneath the surface of the ground.

An object of the invention is to provide equipment which is mounted on conventional planting apparatus so that one device for mixing the chemicals may serve a plurality of rows of the planting apparatus and equipment which may be driven by the power take-off of a tractor or the like employed for pulling the planting apparatus and wherein the planting apparatus forms a part of the equipment for mixing the chemicals with the soil.

A still further object of the invention is to provide chemical mixing and distributing apparatus for delivering chemical materials into the soil as it has been prepared by a seed opener sweep or sweeps of planting equipment to provide trenches into which seed is distributed and to provide equipment for delivery of chemical material to the soil in the area where seed is deposited by planters.

Other objects and features of the invention will be appreciated and possibly become apparent as the present disclosure proceeds and upon consideration of the following detailed description and the accompanying drawings wherein several embodiments of the invention are disclosed.

In the drawings:

Fig. 5 is a side elevational view partly in section showing a modified type of device for delivery and distribution of chemicals to the soil.

Fig. 6 is a bottom view of the elements shown in Fig. 5.

Fig. 7 is a fragmentary sectional view taken on the line 7—7 of Fig. 5.

Fig. 8 is a sectional view taken on the line 8—8 of Fig. 5.

Figure 1:
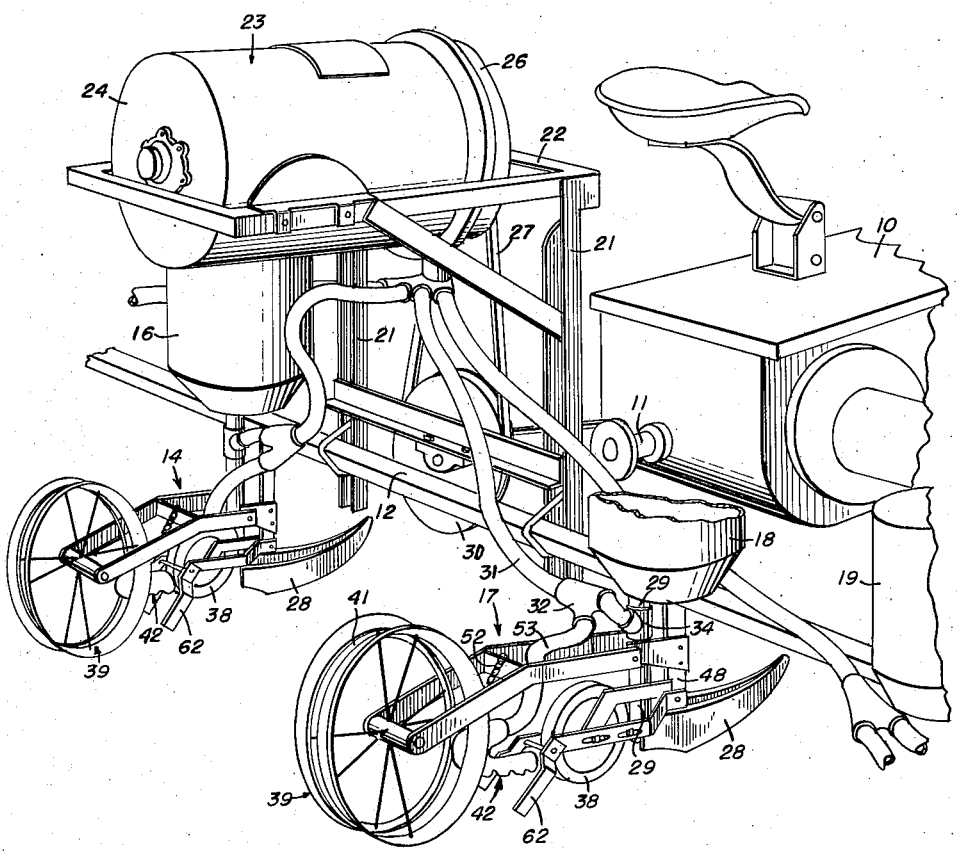
Fig. 1 is a perspective view of a portion of a conventional type of planting apparatus illustrating the chemical mixing and distributing apparatus exhibiting the invention in association with the seed depositing elements of a multiple row planter.

Referring to the drawings there is shown at 10 a portion of a tractor or the like which may be employed as draft equipment for a multiple row planter. The tractor may be provided with the usual power take-off which is represented at 11. A bar 12 detachably mounted on the tractor provides support for elements of the multiple row planter. The assembly shown at 14 provides equipment for depositing seed from a hopper 16 in the soil in one row while the assembly represented at 17 make up equipment for depositing seed in the soil in another row from the hopper 18. Additional assemblies of such a type or of a similar nature may be provided to plant seed from additional hoppers and may be mounted on the bar 12 and a hopper 19 for an additional row planting assembly is in part illustrated in Fig. 1. The apparatus for mixing and distributing chemicals to the soil may be attached to any conventional planter of a single or multiple row type.

A frame structure including uprights 21 is supported on the bar 12 and these columns and the frame structure 22 provide support for a mixing mechanism 23. This mechanism is adapted to mix pulverulent chemical materials for delivery from the drum 24 by a fan encased in a housing 26. The mixing apparatus and the fan may be driven by a belt 27 which is trained over a pulley 30 and driven by means from the power take-off 11. The mixing apparatus 23 and the fan housed in the casing 26 are of conventional construction.

Figure 2:
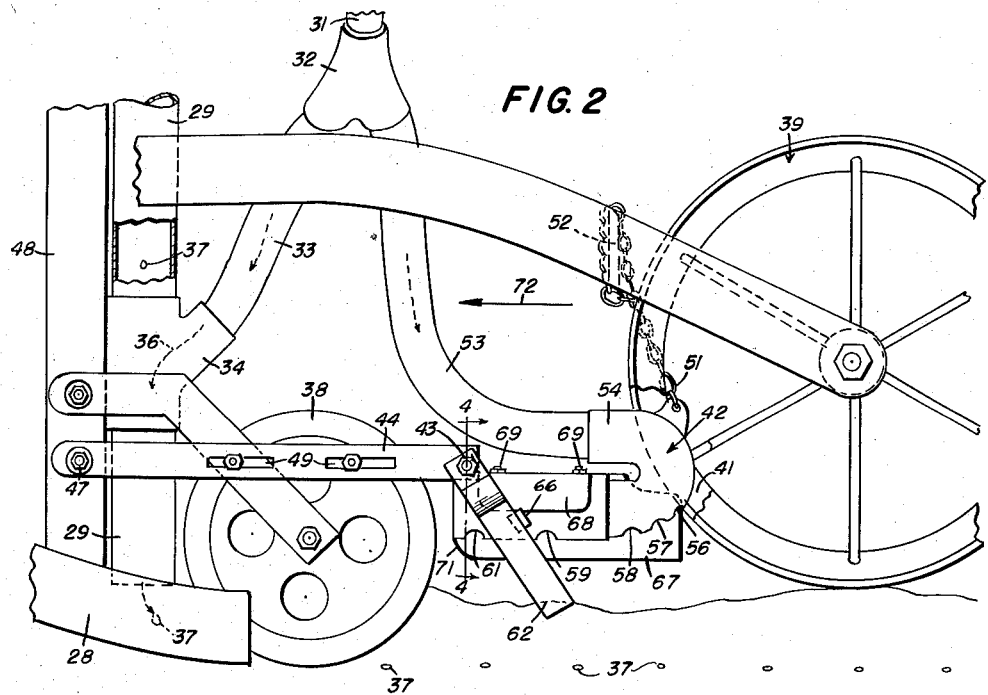
Fig. 2 is an enlarged side elevational view partly in section of a portion of the planting equipment showing the manner in which the air borne chemical materials are supplied to the soil.

The seed stored within the hopper 18 is guided downwardly towards the soil and into a trench formed therein by the opener sweep 28. The seed guide tube is indicated at 29 and the lower end thereof terminates within the soil opener sweep 28 as shown in Fig. 2. A flexible conduit 31 extends from the outlet of the fan casing 26 for delivering a mixture of air and pulverulent chemical materials from the mixing mechanism 23. A conduit fitting 32 is provided in the conduit 31 and a flexible pipe 33 (Fig. 2) extends from the fitting 32 into an adapter 34 fitting forming a part of the seed guide tube 29. A portion of the pulverulent chemical material and air as propelled by the fan is thus delivered into the seed guide tube 29 and the mixture moves in the direction of the arrow 36. The adapter 34 is so constructed as to discharge the chemical material and the air in a downward direction in the seed drop tube 29 and thereby does not interfere with the downward movement of the seeds 37.

Figure 3:
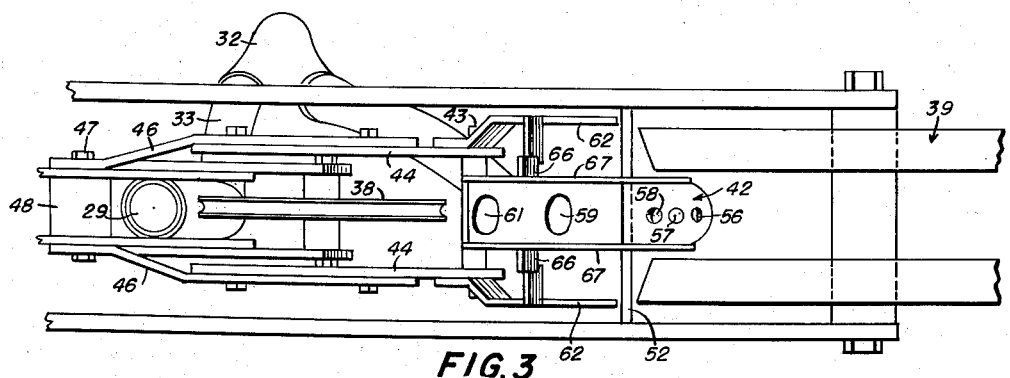
Fig. 3 is a bottom view of the structure shown in Fig. 2.

The planting assembly for each row as shown in Figs. 1 to 3 may include a seed embedding wheel 38 particularly if the soil is of a loose type. The embedding wheel 38 presses the seed in the bottom of the trench formed by the soil opening sweep 28 and also presses the chemical material supplied in the open trench through the seed guide tube 29 into the soil. Thus the seed 37 and chemical materials are partly covered as a result of some of the soil tumbling back into the trench after the opening sweep 28 and the seed drop tube 29 have moved forwardly. The planting equipment may also include a soil packing wheel as represented at 39. These wheels may be of the type wherein the structure making up the periphery of the wheel is open as indicated at 41 so as to avoid compacting the soil immediately over the deposited seed.

Figure 4:
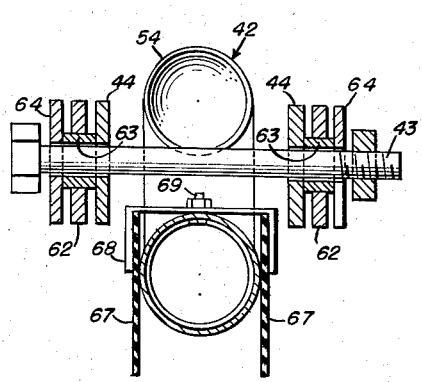
Fig. 4 is a sectional view taken on the line 4—4 of Fig. 2.

The invention further pertains to means intermediate the seed drop tube 29 and the soil compacting wheel 39 to further mix the chemical material with the soil before the trench has been closed and during the closure thereof. A U-shaped tubular member 42 is arranged immediately forwardly of the soil packing wheel 39 as shown in Figs. 1 and 2. The tubular member 42 is supported at its forward end by means of a bolt 43 which extends through transversely spaced bars 44 (Figs. 2 and 4). The bars 44 are further supported by adapter straps 46 (Fig. 3) which are pivotally connected at 47 to a part 48 of the planter frame. The bars 44 and the straps 46 are provided with slots 49 so as to permit forward and rearward adjustment of the tubular member 42 while maintaining it over the row or trench for the seed 37. The rear end of the distributor tube or U-shaped tubular member 42 is supported by a flexible element such as a chain 51 having the upper end attached to a frame member 52 of the planter. The distributor tube 42 is prevented from moving laterally of the planter or laterally of the direction of movement by the supporting straps 46 but is free to swing upwardly when any irregularities are encountered so that it may return to a position immediately over the trench by gravity action.

A flexible pipe 53 extends from the conduit fitting 32 and is connected to the leg 54 of the U-shaped tubular member 42 so as to deliver the mixture of chemical material and air into the distributor tube 42. The distributor tube 42 is provided with a series of downwardly directed openings and one 56 is at such an angle as to direct some of the pulverulent material rearwardly with respect to the direction of motion of the planting apparatus. Another opening 57 is formed in the arcuate part of the tubular member 42 while another opening 58 is positioned forwardly of the opening 57. A larger opening 59 is arranged in the intermediate straight portion of the tubular member 42. A further opening 61 of large dimensions is positioned adjacent the forward end of the second and lower horizontally disposed leg of the U-shaped tubular member 42.

A pair of scratchers are provided in the form of soil engaging arms 62 at each side of the distributor tube 42. The scratching arms 62 are mounted for pivoting movement on the bolt 43 and this structure is best shown in Figs. 2 and 4. The arms rotate about spacer sleeves 63 which prevent binding of the pivoted ends of the scratcher arms 62 between the side faces of the bars 44 and the washers 64. The scratcher arms 62 are so mounted that they slope downwardly and rearwardly from the supporting bolt 43 which serves as a shaft and the arms have sufficient weight to move into soil engaging positions for scratching the soil in the vicinity of the trench and assisting in covering the seed. Stop members 66 carried by the distributor tube 42 limit upward swinging movement of the scratcher arms 62 when the planting equipment is raised from a soil engaging position.

A flexible shield 67 is provided at each side of the lower leg of the distributor tube 42 and these shields may be secured thereto by means of a fitting 68 attached to the tubular member 42 by means of screws 69. These shields extend below the lower extremities of the distributor tube 42 from the front to the rear thereof. The forward corners of the shields 67 may be rounded as indicated at 71.

In operation and when the planting apparatus is moved forwardly in the direction of the arrow 72 (Fig. 2) the soil opener sweeps 28 of each planting assembly push the soil to the side and form a trench into which the seed 37 are deposited by the respective seed guide tube 29. The chemical material supplied to the open trench through the adapter 34 and the low portion of the seed guide tube 29 are deposited in the very bottom of the trench. As the equipment moves forwardly some of the soil at the sides of a trench gravitates back into the trench. The wheel 38 pushes the seed into the soil at the bottom of the trench and thus embeds the seed and the chemical mixture delivered through the pipe 33. The chemical material supplied through the flexible pipe 53 and into the U-shaped tubular member 42 escapes through the outlet opening 61 treats an area in the trench immediately behind the wheel 38. The soil scratchers 62 engage the soil at the sides of the trench and crumble some soil thereinto over the seed 37 and over the chemical material delivered through the outlet opening 61. The chemical material escaping through the outlet openings 59 and 58 treat the soil delivered into the trench by the scratcher arms 62. Any trash or stones in the path of the scratcher arms 62 cause them to swing upwardly and after passing such obstructions the scratchers return by gravity to the position shown in Fig. 2. The chemical materials delivered through the openings 57 and 56 treat the ground over the dirt deposited in the trench by the scratcher arms 62 and supply the chemical to the soil immediately prior to being packed by the wheel 39.

The solids of the mixture as it turns from the leg 54 to the lower leg of the distributor tube tends to separate the heavier particles from the others to thereby deliver the more concentrated pulverulent materials to the outside circumference of the elbow. The change of direction insures that the air will carry the lighter chemical material to that portion of the distributor tube where the outlet openings are located. The flexible shields 67 substantially enclose the exposed area of the distributor tube so that the chemical material settles rapidly and drift is held to a minimum. The air borne chemical material entering the distributor tube 42 also moves at a lower rate of speed in the lower leg of the U-shaped tubular member 42 because of its larger cross section. The reduced velocity causes the chemical particles to settle rapidly and facilitate the discharge through the outlet openings. The dust laden air discharged through the outlet opening 61 moves in a forward direction with respect to the direction of movement of the cultivator and thereby opposing air currents created by the planter movement and the fan of the tractor. These factors tend to hold the chemical material stationary under the shields 67. The shields serve the further purpose of protecting the escaped chemical from being blown away by cross wind currents. The shields being flexible may distort upon engagement of any rock or other objects but move back to normal positions after such objects are passed.

A modified distributor structure is shown in Figs. 5 to 8. The lower leg of the U-shaped tubular member 76 is of greater length measured in the direction of movement of the planter. The distributor 76 is attached to the planter frame 48 by brackets 77 which are rigidly secured to the frame at 78. The distributor tube 76 is attached to the other end of the brackets 77 by means of a bolt 79. The bolt 79 is rigidly supported by the brackets 77 but serves as pivot for the distributor tube 76. A pair of scratching arms 81 are also pivotally attached to the bolt 79 which serves as a shaft. These scratcher arms are adapted to swing downwardly by gravity action about the axis of the bolt 79. The rear end portion of the tubular member 76 may be supported by a flexible element such as a chain 82 which is attached at its upper end to a frame member 83. A bar 84 which is pivotally mounted on the bolt 79 is supported at its rear end by a rod 86 having a hook at the lower end thereof for engaging any one of the holes 87 and the upper end thereof is secured to the frame 83 by a clamp 88 which also serves as a support for the chain 82. A pair of scratcher arms 91 are attached to the bar 84 and are pivotally supported at 89. Additional scratcher arms 92 are also pivotally supported by the bolt 89 as best shown in Fig. 7. Springs 93 resiliently urge the scratcher arms 91 and 92 to soil engaging positions. A flexible shield 94 is provided along opposite sides of the distributor tube 76. The shield 94 is flared at its forward end as indicated at 96 and held in place by straps 97 and suitable fastening devices. The lower leg of the distributor tube 76 is provided with a plurality of openings for discharging the chemical material in the trench created during forward movement of the soil separating blade of the planter and the chemical material is distributed through these openings into the trench and into the soil as it is returned to the trench to cover the seed.

While the invention has been described with reference to particular structural features and with regard to general embodiments it will be appreciated that changes may be made in the overall structure as well as in the various parts of the equipment. Such changes and other modifications may be made without departing from the spirit and scope of the invention as set forth in the appended claims.

What I claim and desire to secure by Letters Patent is:

1. Apparatus for treating seed and soil with chemical material during the planting of the seed comprising, a planter having means thereon providing a trench in soil during forward movement thereof, a U-shaped tubular member having an upper leg and a lower leg, means carried by the planter supporting said tubular member with the lower leg in a substantially horizontal position longitudinally over said trench, said lower leg being of larger cross section than the upper leg, a guide tube carried by said planter for delivering seed into the trench forwardly of said tubular member, a fan, means supplying chemical material to said fan, conduit means guiding the flow of chemical material and air delivered by said fan into said guide tube and into the upper leg of said tubular member, the lower leg of said tubular member having an opening in a lower forward portion thereof for distributing some of the chemical material to the soil at the bottom of the trench, means moving soil at the sides of the trench thereinto over the seed, said lower leg having an opening for directing some of the chemical material onto the soil as it is being moved into the trench, and said lower leg having an additional opening for delivery of some of the chemical material onto the soil after it has been moved into the trench.

2. Apparatus according to claim 1 wherein the openings adjacent the free end of the lower leg are of larger size than the openings adjacent the juncture of the lower end upper legs.

3. Apparatus for treating seed and soil with chemical material during the planting of the seed comprising, a planter having means thereon providing a trench in soil during forward movement thereof, a tubular member, means carried by the planter supporting a portion of said tubular member in a substantially horizontal position over and longitudinally of said trench, a guide tube carried by said planter for delivering seed into the trench forwardly of said tubular member, a supply of chemical material, means providing a current of air for mixture with and forcing said chemical material from said supply as an air borne chemical mixture, conduit means guiding some of said air borne chemical mixture into said guide tube for delivery with the seed onto the soil at the bottom of the trench, conduit means guiding some of said air borne chemical material into said tubular member, said tubular member having an opening at the lower forward portion thereof for distributing some of the chemical material onto the soil at the bottom of the trench and over the seed, means moving soil at sides of the trench thereinto over the seed, said tubular member having an opening for directing some of the chemical material onto the soil as it is being moved into the trench, and said tubular member having an additional opening therein for the delivery of some of the chemical material onto the soil after it has been moved into the trench.

4. Apparatus according to claim 3 including a flexible shield at each side of the tubular member extending therebelow, and means supporting said shield on the tubular member.

5. Apparatus for treating seed and soil with chemical material during the planting of the seed comprising, a planter having means thereon providing a trench in soil during forward movement thereof, a tubular member, means carried by the planter supporting a portion of said tubular member in a substantially horizontal position over and longitudinally of said trench, a guide tube carried by said planter for delivering seed into the trench forwardly of said tubular member, means providing a supply of air borne chemical material under pressure greater than atmospheric, conduit means guiding the forced flow of air borne chemical material into said tubular member, said tubular member having an opening at the lower forward portion thereof for distributing some of the chemical material to the soil at the bottom of the trench and onto the seed, means moving soil at the side of the trench thereinto over the seed, said tubular member having an opening rearwardly of the first opening for directing some of the chemical material into the soil as it is being moved into the trench, and said tubular member having an additional opening therein rearwardly of the second opening for the delivery of some of the chemical material onto the soil after it has been moved into the trench.

References Cited in the file of this patent

UNITED STATES PATENTS

| | | |
|---|---|---|
| 1,667,923 | Bishop | May 1, 1928 |
| 2,295,472 | Hopkins | Sept. 8, 1942 |
| 2,643,796 | Gustafson | June 30, 1953 |
| 2,712,198 | Smith | July 5, 1955 |
| 2,754,622 | Rohnert | July 17, 1956 |
| 2,812,732 | Meisdalen | Nov. 12, 1957 |

FOREIGN PATENTS

| | | |
|---|---|---|
| 530,673 | Canada | Sept. 25, 1956 |
| 200,858 | Great Britain | July 23, 1923 |
| 612,779 | Great Britain | Nov. 17, 1948 |